(12) United States Patent
Celebioglu et al.

(10) Patent No.: US 7,796,585 B2
(45) Date of Patent: Sep. 14, 2010

(54) NETWORK SWITCHING IN A NETWORK INTERFACE DEVICE AND METHOD OF USE THEREOF

(75) Inventors: Onur Celebioglu, Austin, TX (US); Robert L. Winter, Leander, TX (US)

(73) Assignee: Dell Products, LP, Round Rock, TX (US)

( * ) Notice: Subject to any disclaimer, the term of this patent is extended or adjusted under 35 U.S.C. 154(b) by 129 days.

(21) Appl. No.: 12/124,336

(22) Filed: May 21, 2008

(65) Prior Publication Data

US 2009/0290595 A1 Nov. 26, 2009

(51) Int. Cl.
*H04L 12/66* (2006.01)
(52) U.S. Cl. ..................................... 370/356
(58) Field of Classification Search ................ 370/356, 370/360, 395.31
See application file for complete search history.

(56) References Cited

U.S. PATENT DOCUMENTS

| | | | |
|---|---|---|---|
| 7,013,352 B2* | 3/2006 | Garnett | 710/1 |
| 7,024,257 B2* | 4/2006 | Pearce et al. | 700/72 |
| 7,082,132 B1* | 7/2006 | Beshai et al. | 370/391 |
| 7,203,763 B2 | 4/2007 | Noel, Jr. et al. | |
| 7,411,904 B2* | 8/2008 | Foote et al. | 370/230 |
| 7,433,363 B2* | 10/2008 | Rosen et al. | 370/413 |
| 7,480,242 B2* | 1/2009 | Schwartz et al. | 370/235 |
| 7,480,303 B1* | 1/2009 | Ngai | 370/395.5 |
| 7,493,426 B2* | 2/2009 | Chadha et al. | 710/29 |
| 2002/0110155 A1* | 8/2002 | Pearce et al. | 370/519 |
| 2002/0126661 A1* | 9/2002 | Ngai | 370/380 |
| 2003/0189924 A1* | 10/2003 | Kadambi et al. | 370/360 |
| 2004/0252685 A1* | 12/2004 | Kagan et al. | 370/389 |
| 2005/0053057 A1* | 3/2005 | Deneroff et al. | 370/360 |
| 2005/0243708 A1* | 11/2005 | Bunyk | 370/200 |
| 2006/0007915 A1* | 1/2006 | Frame | 370/352 |
| 2006/0085540 A1 | 4/2006 | Mayerson et al. | |
| 2008/0037560 A1* | 2/2008 | Jia et al. | 370/400 |
| 2008/0181158 A1* | 7/2008 | Bouazizi et al. | 370/312 |
| 2009/0016458 A1* | 1/2009 | Asati et al. | 375/261 |
| 2009/0274157 A1* | 11/2009 | Vaidya et al. | 370/400 |

OTHER PUBLICATIONS

"JLAB HPC Clusters" Jefferson Lab. <http://www.jlab.org/hpc/clusters/intel/index.html>.

* cited by examiner

*Primary Examiner*—Chi H Pham
*Assistant Examiner*—Fan Ng
(74) *Attorney, Agent, or Firm*—Larson Newman & Abel, LLP (57) ABSTRACT

A network interface device includes a host port, two network ports, and a switch that can direct communications between the host port, and the two network ports. A data processing system includes an information handling system coupled to a first network, and second and third information handling systems. The information handling systems are coupled in series. Communications received by the network that are addressed to the first information handling system are sent to the first information handling system, but not to the second or third information handling system. A method includes directing a communication from an information handling system to a first port when the communication has a target address that is less than the address of the information handling system or to a second port when the communication has a target address that is greater than the address of the information handling system.

10 Claims, 3 Drawing Sheets

NETWORK SWITCHING IN A NETWORK INTERFACE DEVICE AND METHOD OF USE THEREOF

FIELD OF THE DISCLOSURE

This disclosure relates generally to information handling systems, and more particularly to networks of information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, data storage systems, and networking systems.

Information handling systems are often coupled together into networks or clusters in order to share resources or perform large processing tasks efficiently. Networks of information handling systems are typically created by coupling the individual information handling systems to an external router. The router functions to receive communications from the information handling systems, determine the target of the communications, and forward the communications to the target information handling system. Routers can couple between several and several hundred information handling systems, depending on the application. Therefore, routers can themselves be large, complex devices that consume large amounts of power. Also, the larger the network served by a router, the longer it takes for the router to determine the target of a communication and forward it to the target information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, a wireless router, or another network communication device, or any other suitable device, and can vary in size, shape, performance, functionality, and price. An information handling system can also include a set of any of the foregoing devices.

The information handling system can include memory (volatile (e.g. random access memory (RAM), etc.), nonvolatile (read only memory (ROM), flash memory, etc.), or any combination thereof), one or more processing resources, such as a central processing unit (CPU), hardware, firmware, or software control logic, or any combination thereof. Additional resources of the information handling system can include one or more storage devices, one or more communications ports for communicating with external devices, as well as various input and output (I/O) devices, such as a keyboard, a mouse, a video display, or any combination thereof. The information handling system can also include one or more buses operable to transmit communications between the various hardware resources. Portions of an information handling system may themselves be considered information handling systems.

Portions of an information handling system, when referred to as a "device", a "module", or the like, may be configured as hardware, firmware, software, or any combination thereof. For example, a device or a module may be hardware. A non-limiting example of a device or a module implemented as hardware includes: an integrated circuit (e.g., an Application Specific Integrated Circuit (ASIC), a Field Programmable Gate Array (FPGA), a structured ASIC, or a device embedded on a larger chip), a card (e.g., a Peripheral Component Interface (PCI) card, a PCI-express card, a Personal Computer Memory Card International Association (PCMCIA) card, or other such expansion card), or a system (e.g., a motherboard, a system-on-a-chip (SoC), or a stand-alone device). Similarly, the device or module can be firmware (i.e., any software running on an embedded device, a Pentium class or PowerPC™ brand processor, or other such device) or software (i.e., any software capable of operating in the relevant environment). The device or module can also be a combination of any of the foregoing examples of hardware, firmware, or software. Note that an information handling system can include an integrated circuit or a board-level product having portions thereof that can also be any combination of hardware or software.

Devices or programs that are in communication with one another need not be in continuous communication with each other, unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. A network element may be a node, a piece of hardware, software, firmware, middleware, another component of a computing system, or any combination thereof. In this context, a communicative interaction may be intending to send information, sending information, requesting information, receiving information, receiving a request for information, or any combination thereof. As such, a communicative interaction could be unidirectional, bi-directional, multi-directional, or any combination thereof. In some circumstances, a communicative interaction could be relatively complex and, involve two or more network elements. For example, a communicative interaction may be "a conversation," or series of related communications between a client and a server—each network element sending and receiving information to and from the other. Whatever form the communicative interaction takes, the network elements involved need not take any specific form.

A communicative interaction can include management information and content information. As used herein, the term "management information" with respect to a communicative interaction, is intended to mean information used to direct, manage, or other wise control a network. As such, management information can be used by the network elements to identify the particular network elements that are coupled to the network, set-up and initialize the network elements, control routing of communicative interactions, perform another suitable function, or any combination thereof. A non-limiting example of management information includes a router set-up command, data packet header information (e.g., addresses), an Internet Control Message Protocol (ICMP) message (e.g., echo request, router discovery, timestamp, etc.), other suitable management information, or any combination thereof.

The term "content information" with respect to a communicative interaction, is intended to mean information that is not management information. Thus, content information can include information that is targeted to one or more network element, is received by the targeted elements to be processed or manipulated, displayed, stored, forwarded to another network element, perform another suitable function, or any combination thereof. A non-limiting example of content information includes most data packet payload information, a media file (e.g., audio, video, or picture files, etc.), a textual file (e.g., e-mail, word processing files, etc.), a program, a data file (e.g., spreadsheet or database file, etc.), another suitable form of content information, or any combination thereof.

In the description below, a flow-charted technique may be described in a series of sequential actions. The sequence of the actions, and the party performing the steps may be freely changed without departing from the scope of the teachings. Actions may be added, deleted, or altered in several ways. Similarly, the actions may be re-ordered or looped. Further, although processes, methods, algorithms, or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features, but may include other features not expressly listed or inherent to such process, method, article, or apparatus. Further, unless expressly stated to the contrary, "or" refers to an inclusive—or and not to an exclusive—or. For example, a condition A or B is satisfied by any one of the following: A is true (or present) and B is false (or not present), A is false (or not present) and B is true (or present), and both A and B are true (or present).

Also, the use of "a" or "an" is employed to describe elements and resources described herein. This is done merely for convenience, and to give a general sense of the scope of the invention. This description should be read to include one, or at least one, and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only, and not intended to be limiting.

To the extent not described herein, many details regarding specific materials, processing acts, and circuits are conventional, and may be found in textbooks and other sources within the computing, electronics, and software arts.

An information handling system, and method of using it are described below. An exemplary, non-limiting system description is described before addressing methods of using it. Some of the functionality of modules within the system is described with the system. The utility of the system and its modules will become more apparent with the description of the methods that follow the description of the system and modules.

Figure 1:
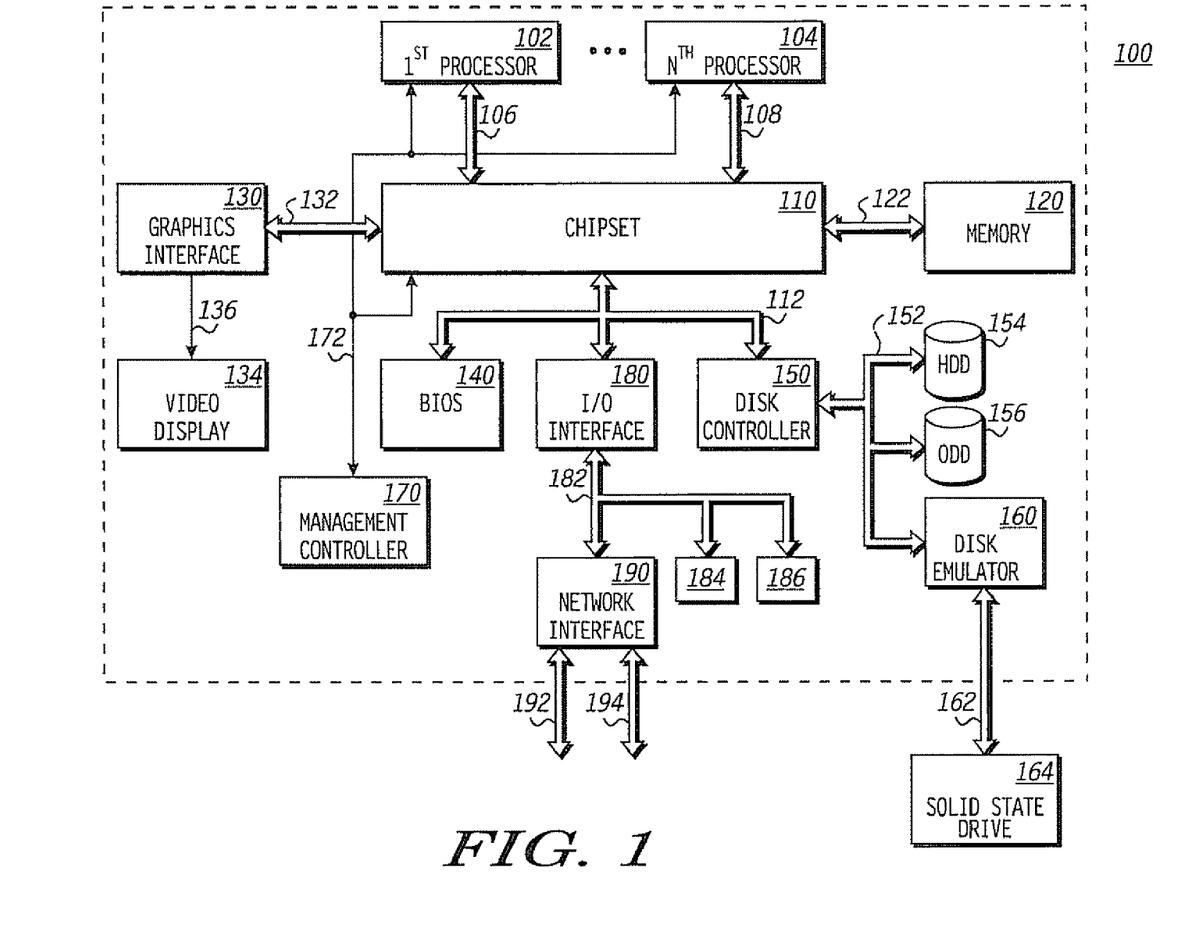
FIG. 1 illustrates a functional block diagram of an information handling system.

FIG. 1 illustrates a functional block diagram of an exemplary embodiment of an information handling system, generally designated as 100. The information handling system 100 can include a processor 102 coupled to a host bus 106, and can further include one or more additional processors, generally designated as an $n^{th}$ processor 104, coupled to a host bus 108. The processor 102 can be coupled to a chipset 110 via the host bus 106 and the $n^{th}$ processor 104 can be coupled to the chipset 110 via the host bus 108. The chipset 110 can support the processors 102 through 104, allowing for simultaneous processing by the processors 102 through 104, and can support the exchange of information within the information handling system 100 during multiple processing operations. In an aspect, the chipset 110 can function to provide access to the processor 102 using host bus 106, and the n$^{th}$ processor 104 using the host bus 108. In another aspect, the chipset 110 can include a dedicated bus (not illustrated) to transfer data between the processor 102 and the n$^{th}$ processor 104.

The information handling system 100 can include a memory 120 coupled to a memory bus 122. In accordance with an aspect, the chipset 110 can be referred to as a memory hub or a memory controller, where the memory 120 can be coupled to the chipset 110 via the memory bus 122. For example, the chipset 110 can include an Accelerated Hub Architecture (AHA) enabled-chipset that can include a memory controller hub and an I/O controller hub. As a memory controller hub, the chipset 110 can be coupled to the host buses 106 through 108, and the memory bus 122 as individual buses, or as part of the same bus (not illustrated). The chipset 110 can also provide bus control and can handle transfers between the host buses 106 through 108, and the memory bus 122. In accordance with another aspect (not illustrated), the information handling system can include a separate memory dedicated to each processor 102 through 104. Each memory can include a memory bus coupled between each processor 102 through 104 and its dedicated memory. In accordance with yet another aspect, the chipset 110 can be generally considered an application specific chipset that provides connectivity to various buses, and integrates other system functions. For example, the chipset 110 can be provided using a chipset that includes two parts: a Graphics and Memory Controller Hub (GMCH) and an I/O Controller Hub (ICH). The chipset 110 can also be packaged as an ASIC.

The information handling system 100 can also include a graphics interface 130 that can be coupled to the chipset 110 using the graphics bus 132. The graphics interface 130 can provide a video display output 136 to the video display 134. In one form, the graphics interface 130 can be an Accelerated Graphics Port (AGP) interface to display content within a video display 134. Other graphics interfaces (not illustrated) may also be used in addition to the graphics interface 130 if needed or desired. The video display 134 can include one or more types of video displays, such as a flat panel display or other type of display device.

The information handling system 100 can also include an I/O channel 112 connected to the chipset 110. The I/O channel 112 can include a Peripheral Component Interconnect (PCI) bus, a PCI-Extended (PCI-X) bus, a high-speed link of PCI-Express (PCIe) lanes, another industry standard or proprietary bus or link, or any combination thereof. In one embodiment, a PCI bus can be operated at approximately 66 MHz, a PCI-X bus can be operated at approximately 133 MHz, and a PCIe link can be operated at approximately 250 million bytes per second (MB/s) per lane in each direction. PCI buses, PCI-X buses, and PCIe links can be provided to comply with industry standards for connecting and communicating between various PCI, PCI-X and PCIe enabled hardware devices, respectively. The chipset 110 can include other buses in association with, or independent of, the I/O channel 112, including other industry standard buses (e.g., Industry Standard Architecture (ISA), Small Computer Serial Interface (SCSI), Inter-Integrated Circuit (I$^2$C), System Packet Interface (SPI), or Universal Serial Bus (USB), proprietary buses or any combination thereof.

In an alternate embodiment, the chipset 110 can be a chipset employing a Northbridge/Southbridge chipset configuration (not illustrated). For example, a Northbridge portion of the chipset 110 can communicate with the processors 102 through 104 using the host buses 106 through 108, and can control interaction with the memory 120, the I/O channel 112, and activities for the video graphics interface 130. The chipset 110 can also include a Southbridge portion (not illustrated) of the chipset 110, and can handle I/O functions of the chipset 110. The Southbridge portion can manage basic forms of I/O, such as USB, serial I/O, audio outputs, Integrated Drive Electronics (IDE), ISA I/O, or any combination thereof for the information handling system 100.

The information handling system 100 can also include a basic input/output system (BIOS) module 140 that can be coupled to the I/O channel 112. The BIOS module 140 can include BIOS code operable to detect and identify resources within the information handling system 100, provide the appropriate drivers for those resources, initialize those resources, and access those resources.

The information handling system 100 can further include a disk controller 150 coupled to the I/O channel 112. The disk controller 150 can include a disk interface 152 that can include other industry standard buses (e.g., Integrated Drive Electronics (IDE), Parallel Advanced Technology Attachment (PATA), Serial Advanced Technology Attachment (SATA), SCSI, or USB or proprietary buses, or any combination thereof. The disk controller 150 can be coupled to one or more disk drives via the disk interface 152. Such disk drives include a hard disk drive (HDD) 154 or an optical disk drive (ODD) 156 (e.g., a Read/Write Compact Disk (R/W-CD), a Read/Write Digital Video Disk (R/W-DVD), a Read/Write mini Digital Video Disk (R/W mini-DVD), or another type of optical disk drive), or any combination thereof. The optical disk drive 166 can read a removable data storage medium (e.g., a Compact Disk (CD), a Digital Video Disk (DVD), a mini Digital Video Disk (mini-DVD), or other optical media). Additionally, the information handling system 100 can include a disk emulator 160 that is coupled to the disk interface 152. The disk emulator 160 can permit a solid-state drive 164 to be coupled to the information handling system 100 via an external interface 162. The external interface 162 can include other industry standard busses (e.g., USB or IEEE 1394 (Firewire)) or proprietary busses, or any combination thereof. Alternatively, the solid-state drive 164 can be disposed within the information handling system 100.

The information handling system 100 can further include a management controller 170 that can be coupled to the chipset 110 via a system communication bus 172, such as a control bus. The management controller 170 may be on a main circuit board (e.g., a baseboard, a motherboard, or any combination thereof), integrated onto another component such as the chipset 110, in another suitable location, or any combination thereof. Although not illustrated, another resource, such as the processors 102 or 104, the memory 120, the graphics interface 130, the video display 134, the I/O interface 140, or the disk controller 150, or any combination thereof, can be coupled to the management controller 170. Commands, communications, or other signals may be sent to or received from the management controller 160 by any one or any combination of resources previously described. The management controller 160 can be part of an integrated circuit or a chip set within the information handling system 100.

The information handling system 100 can also include an I/O interface 180 that can be connected to the chipset 110 via the I/O channel 112. The I/O interface 180 can be coupled to a peripheral channel 182 that can be of the same industry standard or proprietary bus or link architecture as the I/O channel 112, or of a different industry standard or proprietary bus or link architecture than the I/O channel 112. As such, the I/O interface 180 can extend the I/O channel 112 capacity when the peripheral channel 182 is the same as the I/O channel 112, or translate information from a type suitable to the industry standard or proprietary bus or link architecture of the I/O channel 112 to a type suitable to a different industry standard or proprietary bus or link architecture, and vise versa, when the peripheral channel 182 is different than the I/O channel 182. Other I/O interfaces (not illustrated) may also be used in addition to the I/O interface 180, if needed or desired.

The peripheral channel 182 can include a bus structure that allows the installation and coupling of additional resources 184 through 186 to the information handling system. In accordance with an aspect (not illustrated), the peripheral channel 182 can also include one or more point-to-point links to the additional resources 184 through 186. The external resources 184 through 186 can include a data storage system, a graphics interface, another suitable resource or any combination thereof. The additional resources 184 through 186 can be on a main circuit board, on separate circuit boards or add-in cards disposed within the information handling system 100, devices that are external to the information handling system 100, or any combination thereof.

The information handling system 100 can also include a network interface device 190 that is coupled to the I/O interface 180 via the peripheral channel 182. The network interface device 190 may be a network interface card (NIC) disposed within the information handling system 100, on a main circuit board (e.g., a baseboard, a motherboard, or any combination thereof), integrated onto another component such as the chipset 110, in another suitable location, or any combination thereof. The network interface device 190 can include a network channel 192 and a network channel 194. The network interface device 190 can also include additional network channels (not illustrated). In accordance with an aspect, the network channels 192 and 194 are of a different industry standard or proprietary bus or link architecture than the peripheral channel 182, and the network interface device 190 can translate information from a type suitable to the industry standard or proprietary bus or link architecture of the peripheral channel 182 to a type suitable to the industry standard or proprietary bus or link architecture of the network channels 192 and 194, and vise versa. The network channels 192 and 194 can be of industry standard architecture (e.g., InfiniBand, Fibre Channel, Gb Ethernet, etc.), proprietary channel architecture, or any combination thereof. Other network interface devices (not illustrated) may also be used in addition to the network interface device 190, if needed or desired. The network channels 192 and 194 can be coupled to network resources (not illustrated). The network resource can include another information handling system, a data storage system, another network, a grid management system, another suitable resource or any combination thereof.

Figure 2:
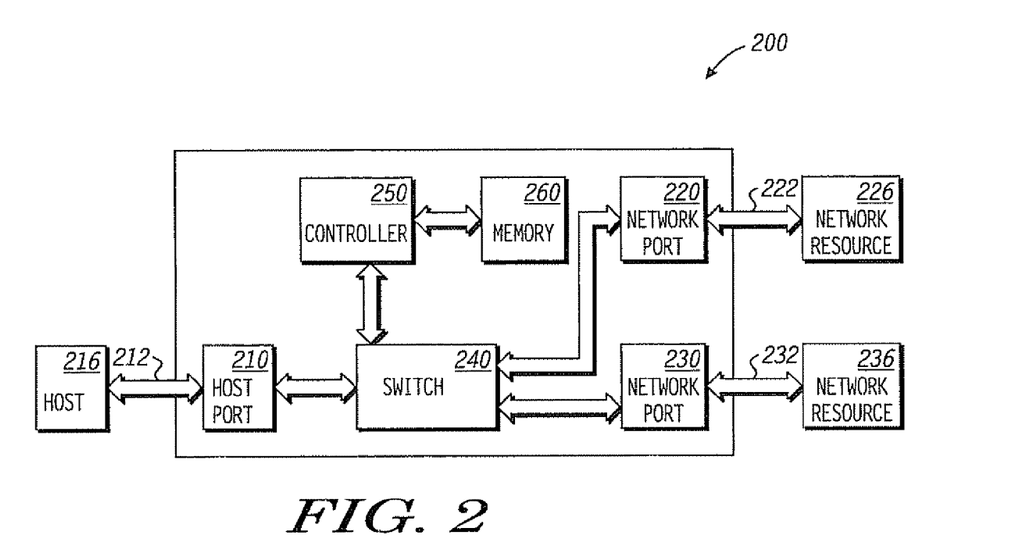
FIG. 2 illustrates a functional block diagram of a network interface device.

A particular network interface device is illustrated in FIG. 2 and generally designated as 200. The network interface device 200 can provide similar functionality to the network interface device 190. Such embodiments are for illustrative purposes and not to limit the scope of the present invention. The network interface device 200 can include a host port 210. The host port 210 can include a host channel 212 that can be similar to the peripheral channel 182. The host port 210 can be coupled to a host 216 that can include an I/O interface similar to the I/O interface 180. The network interface device 200 can also include a network port 220 and a network port 230. The network port 220 can include a network channel 222 that can be similar to the network channel 192, coupling the network interface device 200 to a network resource 226. Likewise, the network port 230 can include a network channel 232 that can be similar to the network channel 194, coupling the network interface device 200 to a network resource 236. The network interface device 200 can include an additional network channel (not illustrated) that can provide coupling to another separate network, provide parallel functionality to the network ports 220 and 230 (e.g., creating a redundant network), or any combination thereof.

The network interface device 200 can include a switch 240. The switch 240 can be coupled to the host port 210 and the network ports 220 and 230. The network interface device 200 can also include a controller 250 that can be coupled to the switch 240. The controller 250 can also be coupled to a memory 260. The switch 240 can direct a communication between the host port 210, the network ports 220 and 230, and the controller 250. For example, a communication received by the host port 210 can be directed by the switch 240 to the controller 250, to the network port 220 to be sent to the network resource 226, or to the network port 230 to be sent to the network resource 236. Likewise, a communication received by the network port 220 can be directed by the switch 240 to the controller 250, to the host port 210 to be sent to the host 216, or to the network port 230 to be sent to the network resource 236. Similarly, a communication received by the network port 230 can be directed by the switch 240 to the controller 250, to the host port 210 to be sent to the host 216, or to the network port 220 to be sent to the network resource 226. Also, a communication from the controller 250 can be directed by the switch 240 to the host port 210 to be sent to the host 216, to the network port 220 to be sent to the network resource 226, or to the network port 230 to be sent to the network resource 236.

In a non-limiting embodiment, the host 216 and the network resources 226 and 236 can each have a unique device address. The device address can include a Media Access Control (MAC) address or other data link layer identifier, an Internet Protocol (IP) address or other network/internet layer identifier, another suitable identifier, or a combination thereof. A communication received by the network interface device 200 can include management information that includes a target field that identifies the device address of the intended target of the communication. In a non-limiting embodiment, the switch 240 can read the target field to determine the device address of the intended target of the communication received from the host port 210, the network ports 220 and 230, and the controller 250, and direct the communication to the appropriate target.

In another non-limiting embodiment, the controller 250 can read the target field of all communications received by the network interface device 200. Here, the switch 240 can receive a communication from the host port 210 or the network port 220 or 230, and direct it to the controller 250. The controller 250 can then read the target field to determine the device address of the intended target of the communication. If the controller 250 is the intended target, then the controller 250 can retain the communication. If the host 216 or the network resource 226 or 236 is the intended target of the communication, then the controller 250 can send the communication to the switch 240 and control the switch 240 to direct the communication to the host port 210 to be sent to the host 216, to the network port 220 to be sent to the network resource 226, or to the network port 230 to be sent to the network resource 236, as called for by the device address.

In another non-limiting embodiment, the host 216 and the network resources 226 and 236 can each have a unique sequential location number. The host 216 can have a particular location number, the network resource 226 can have a location number that is greater than the location number of the host 216, and the network resource 236 can have a location number that is less than the location number of the host 216. The location numbering scheme can be implemented using a look-up table or another suitable resource to map the device address of the host 216 and the network resources 226 and 236 to the location numbers that reflect the logical locations of the host 216, and the network resources 226 and 236, respectively. In this way, a communication received by the network interface device 200 can include a target field that identifies the location number of an intended target of the communication that is not recognized by the network interface device 200.

For example, the network resource 226 can have a location number equal to 5, the host 216 can have a location number equal to 6, and the network resource 236 can have a location number equal to 7. When the host 216 sends the network interface device 200 a communication with a target field that corresponds to a location number that is greater than 6 (e.g., 7, 8, 10, etc.), the network interface device 200 can direct the communication to the network port 230 to be sent to the network resource 236. When the host 216 sends the network interface device 200 a communication with a target field that corresponds to a location number that is less than 6 (e.g., 0, 1, 5, etc.), the network interface device 200 can direct the communication to the network port 220 to be sent to the network resource 226. A communication received by the network interface device 200 from the network resource 226 or 236 can be inspected to determine if the target field corresponds to a location number that is equal to 6 (e.g., when the host 216 is the intended target). If so, the network interface device 200 can direct the communication to the host port 210 to be sent to the host 216. If not, the network interface device 200 can direct a communication received by the network port 220 to the network port 230 to be sent to the network resource 236, and can direct a communication received by the network port 230 to the network port 220 to be sent to the network resource 226.

Larger networks of resources can be created where each resource can include a network interface device that provides similar functionality to the network interface device 200. Such a network can be coupled together in a serial configuration, where a network port of a particular information handling system can be coupled to a network port of an adjacent information handling system, and the other network port of the particular information handling system can be coupled to a network port of another adjacent information handling system. Note that the term "adjacent" is not meant to limit the physical location of the information handling systems, but rather to convey a logical location in a serial network.

Figure 3:
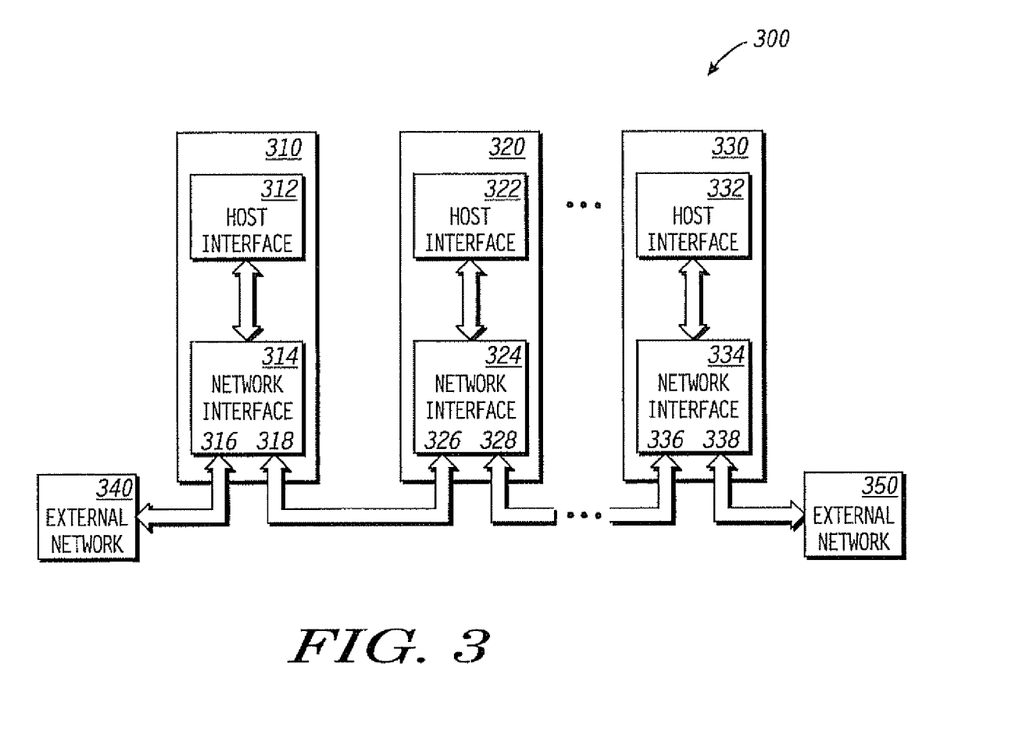
FIG. 3 illustrates a functional block diagram of an embodiment of a network of serially coupled information handling systems.

FIG. 3 illustrates a functional block diagram of an exemplary embodiment of a network of serially coupled information handling systems, generally designated as 300. The network 300 can include information handling systems 310 and 320, and an $n^{th}$ information handling system 330, each of which can provide similar functionality to the information handling system 100. Each of the information handling systems 310 and 320, and the $n^{th}$ information handling system 330 can include a host interface 312, 322 and 332, respectively, that can include an I/O interface that is similar to the I/O interface 180. The information handling systems 310 and 320, and the $n^{th}$ information handling system 330 can also include a network interface device 314, 324 and 334, respectively, that can provide similar functionality to the network interface device 190 within the information handling system 100. The network interface devices 314, 324 and 334 can further provide similar functionality to the network interface device 200. The network interface devices 314, 324 and 334 can include network ports 316, 326 and 336 and network ports 318, 328 and 338 that can provide similar functionality to the network ports 192 and 194, and the network ports 220 and 230. The network 300 can include an external network 340 and an external network 350.

The information handling system 310 can be coupled to the external network 340 via the network port 316. The information handling system 310 can also be coupled to the network port 326 of the information handling system 320 via the network port 318. The information handling system 320 can be coupled via the network port 328 to a network port of a next information handling system (not illustrated). In a similar way, each particular information handling system can be coupled via one of the particular information handling system's network ports to the other network port of the next particular information handling system. A penultimate information handling system (not illustrated) can be coupled via a network port to the network port 336 of the $n^{th}$ information handling system 330. The $n^{th}$ information handling system 330 can be coupled to the external network 350 via the network port 338.

The information handling systems 310, 320 and 330, the additional information handling systems (if any), and the external networks 340 and 350 (hereinafter referred to as "nodes" of the network 300) can each have a unique address. A non-limiting example of a unique address includes a device address, a location number, another suitable address, or any combination thereof. Communications on the network 300 can include a target field that identifies the address of the intended target of the communication. The intended target of the communication can include any of the nodes of the network 300 or a device that is not part of the network 300.

For example, the external network 340 can have an address equal to 1, the information handling system 310 can have an address equal to 2, and the information handling system 320 can have an address equal to 3, the $n^{th}$ information handling system can have an address equal to 8, and the external network 350 can have an address equal to 9. The external network 340 can send a communication to the network port 316 in the network interface device 314. The network interface device 314 can read the target field to determine if the information handling system 310 is the intended target of the communication. If so (e.g., the target field is equal to 2), the network interface device 314 can direct the communication to the host interface 312.

If not (e.g., the target field is greater than 2), the network interface device 314 can direct the communication to the information handling system 320 via the network port 318. The network interface device 324 can then read the target field to determine if the information handling system 320 is the intended target of the communication. If so (e.g., the target field is equal to 3), the network interface device 324 can direct the communication to the host interface 322.

If not (e.g., the target field is greater than 3), the network interface device 324 can direct the communication to the next information handling system (not illustrated) via the network port 328. The network interface device of each succeeding information handling system can likewise read the target field of the communication to determine whether to route the communication to the host interface or to the following information handling system. When the $n^{th}$ information handling system 330 receives a communication, the network interface device 334 can read the target field to determine if the $n^{th}$ information handling system 330 is the intended target of the communication. If so (e.g., the target field is equal to 8), the network interface device 334 can direct the communication to the host interface 332. If not (e.g., the target field is greater than 8), the network interface device 334 can direct the communication to the external network 350 via the network port 338.

In this way, a communication initiated in the external network 340 that is targeted to the $n^{th}$ information handling system 330 passes through each node between the external network 340 and the $n^{th}$ information handling system 330. That is, the communication passes through the information handling system 310, then the information handling system 320, then each additional information handling system, before being received by the network interface device 336 of the $n^{th}$ information handling system 330. Similarly, a communication initiated in the external network 350 that is targeted to the information handling system 310 passes through each node between the external network 350 and the information handling system 310. Thus, the communication passes through the $n^{th}$ information handling system 330, then each additional information handling system, then the information handling system 320, before being received by the network interface device 316 of the information handling system 310.

A communication can also originate within an information handling system in the network 300. For example, a communication originating within the information handling system 320 can be sent to the network interface device 324, and the network interface device 324 can read the target field to determine if the address is greater than 3 or less than 3. If the target address is greater than 3, the network interface device 324 can direct the communication to the next information handling system via the network port 328. If the target address is less than 3, the network interface device 324 can direct the communication to the information handling system 310 via the network port 328. A communication that has an intended target that is outside the range of addresses in the network 300 can be handled as an exception by the external networks 340 and 350, can be targeted to resources that are outside of the network 300, can be handled in another suitable manner, or any combination thereof.

Figure 4:
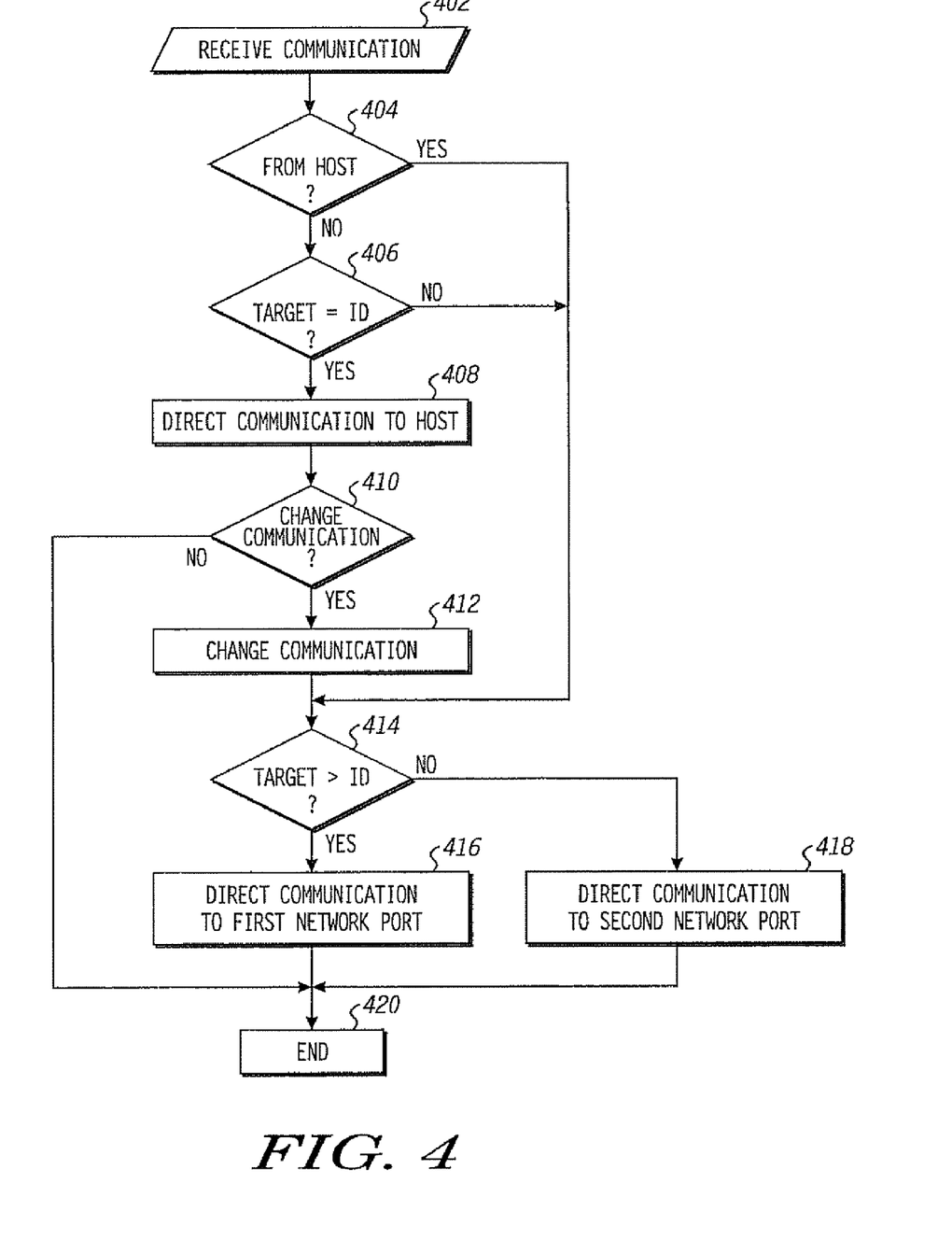
FIG. 4 illustrates a flow diagram of a method of determining the target location for a communication in a network interface device.

FIG. 4 illustrates an embodiment of a method of using a network interface device 200 in an information handling system 100 in a flow chart form. The network interface device 200 can receive a communication from the host 216 or the network resources 226 or 236 in block 402. A decision is made whether the communication was received from the host 216 via the host port 210 in decision tree 404. If not, then a decision is made whether the communication has a target location number that is equal to the location number of the network interface device 200 in decision tree 406. If so, then the communication is directed by the switch 240 to the host port 210 to be sent to the host 216 in block 408. A decision is made whether the communication is to be changed by a processor in the information handling system 100 from a first type to a second type in decision tree 410. If so, the communication is changed from the first type to the second type and sent to the host port 210 in the network interface device 200 in block 412. If not, then processing ends in block 420.

If the communication was received from the host 216 via the host port 210, the "yes" branch of decision tree 404 is taken, or if the communication has a target location number that is not equal to the location number of the network interface device 200, the no branch of decision tree 406 is taken, or if the communication has been changed from the first type to the second type and sent to the host port 210 in the network interface device 200 in block 412, then a decision is made whether the communication has a target location number that is greater than the location number of the network interface device 200 in decision tree 414. If so, then the communication is directed by the switch 240 to the network port 220 to be sent to the network resource 226 in block 416, and processing ends in block 420. If not, then the communication is directed by the switch 240 to the network port 230 to be sent to the network resource 236 in block 418, and processing ends in block 420.

Many different aspects and embodiments of the present disclosure are possible. Some of those aspects and embodiments are described below. After reading this specification, skilled artisans will appreciate that those aspects and embodiments are only illustrative, and do not limit the scope of the present invention.

In accordance with an aspect, an interface device disposed within an information handling system with a processor that can change content information from a first type to a second type can include a host port coupled to the processor, a first network port, a second network port, a switch that can direct a first communication received from the host port to the first network port or the second network port, a second communication received from the first network port to the host port or the second network port, and a third communication received from the second network port to the host port or the first network port.

In one embodiment of the first aspect, the interface device can have a address, and the switch can determine a target address associated with a particular communication, and direct the particular communication to the host port when the target address matches the address of the interface device. In another embodiment of the first aspect, the switch can direct the particular communication to the first port when the target address is less than the address of the interface device. In another embodiment, the switch can direct the particular communication to the second port when the target address is greater than the address of the interface device. In yet another embodiment of the first aspect, the interface device can include a network interface card. In still another embodiment of the first aspect, the interface device can be within a blade server.

In accordance with a second aspect, a data processing system can include a first network connection, a first information handling system coupled to the first network connection, a second information handling system, and a third information handling system, where the first, second, and third information handling systems can be coupled in series, and where the data processing system is configured such that all communications received by the data processing system at the first network connection that are addressed to the first information handling system are received by the first information handling system, but not sent to the second or third information handling system, all communications received by the data processing system at the first network connection that are addressed to the second information handling system are received by the first information handling system and then sent from the first information handling system and received by the second information handling system, but not sent to the third information handling system, and all communications received by the data processing system at the first network connection that are addressed to the third information handling system are received by the first information handling system, then sent from the first information handling system and received by the second information handling system, and then sent from the second information handling system and received by the third information handling system.

In one embodiment of the second aspect, the data processing system can be configured such that all communications that originate from the first information handling system that are to be transmitted to the first network connection do not pass through the second or third information handling system, all communications that originate from the second information handling system that are to be transmitted to the first network connection pass through the first information handling system, but do not pass through the third information handling system, and all communications that originate from the third information handling system that are to be transmitted to the first network connection pass through the first and second information handling systems.

In another embodiment, the first information handling system can include a first processor and a first switch, where the first switch can direct a first communication addressed to the first information handling system to the first processor and not allow the first communication to be received by the second information handling system or the third information handling system, and direct a second communication and a third communication to the second information handing system, where the second communication is addressed to the second information handling system, and the third communication is addressed to the third information handling system. Further, the second information handling system can include a second processor and a second switch, where the second switch can direct the second communication to the second processor and not allow the second communication to be received by the third information handling system, and direct the third communication to the third information handling system. Also, the third information handling system can include a third processor and a third switch, where the third switch is operable to direct the third communication to the third processor.

In another embodiment, the third switch can direct a fourth communication addressed to the third information handling system to the third processor and not allow the fourth communication to be received by the first information handling system or the second information handling system, and direct a fifth communication and a sixth communication to the second information handing system, where the fifth communication is addressed to the second information handling system, and the sixth communication is addressed to the first information handling system. Further, the second switch can direct the fifth communication to the second processor and not allow the fifth communication to be received by the first information handling system, and direct the sixth communication to the first information handling system. Also, the first switch can direct the sixth communication to the first processor.

In yet another embodiment, the data processing system can include a second network connection, where the first information handling system is coupled more closely to a first network connection as compared to the second and third information handling systems, and the third information handling system is coupled more closely to the second network connection as compared to the first and second information handling systems. In still another embodiment, the first network connection can receive the first, second, and third communications, but not the fourth, fifth, and sixth communications, and the second network connection can receive the fourth, fifth, and sixth communications, but not the first, second, and third communications.

In a further embodiment, the data processing system can include at least one additional information handling system substantially identical to and serially coupled between the second information handling system and the first or third information handling system. In another embodiment, each of the first, second, and third information handling system can be a blade server.

In accordance with a third aspect, a method can include providing an information handling system that has a network device and a processor, where the processor can change content information from a first type to a second type, the information handling system can have a address, and the network device can include a host port coupled to the processor, a first network port coupled to a first network system, a second network port coupled to a second network system, and a switch that can direct a communication originating from or passing through the first information handling system. The method can further include directing a first communication from the processor to the first network port when the first communication has a first target address that is less than the address of the information handling system; and directing a second communication from the processor to the second network port when the second communication has a second target address that is greater than the address of the information handling system.

In an embodiment of the third aspect, the method can include directing a third communication from the first network system to the host port when the third communication has a third target address that is the same as the address of the information handling system, and directing a fourth communication from the first network system to the second port when the fourth communication has a fourth target address that is greater than the address of the information handling system. In another embodiment, the method and include directing a fifth communication from the second network system to the first port when the fifth communication has a fifth target address that is less than the address of the information handling system, and directing a sixth communication from the second network system to the host port when the sixth communication has a sixth target address that is the same as the address of the information handling system.

In yet another embodiment, a seventh communication directed to the host port can be of the first type, and the method can further include operating the processor to change the seventh communication from the first type to the second type and communicating the seventh communication to the host port. In still another embodiment, the information handling system, the first network system, and the second network system can be blade servers. In yet another embodiment, the information handling system, the first network system and the second network system can be coupled to a local area network.

Note that not all of the activities described above in the general description or the examples are required, that a portion of a specific activity may not be required, and that one or more further activities may be performed, in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features described herein in the context of separate embodiments for the sake of clarity, may also be provided in combination in a single embodiment. Conversely, various features that are, for brevity, described in the context of a single embodiment, may also be provided separately, or in any sub-combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur, or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An interface device disposed within an information handling system, the interface device having an address and comprising:
    a host port operable to be coupled to a processor disposed within the information handling system, wherein the processor is operable to change content information from a first type to a second type;
    a first network port;
    a second network port;
    a switch operable to direct:
        a first communication received from the host port to the first network port or the second network port;
        a second communication received from the first network port to the host port;
        a third communication received from the first network port to the second network port;
        a fourth communication received from the second network port to the host port;
        a fifth communication received from the second network port to the first network port;
        determine a target address associated with each of the first, second, third, fourth, and fifth communications; and
        direct the second communication and the fourth communication to the host port when the target address matches the address of the interface device.

2. The interface device of claim 1, wherein the switch is further operable to direct the first and fifth communications to the first port when the target address is less than the address of the interface device.

3. The interface device of claim 2, wherein the switch is still further operable to direct the first and third communications to the second port when the target address is greater than the address of the interface device.

4. The interface device of claim 1, wherein the interface device comprises a network interface card.

5. The interface device of claim 1, wherein the interface device is disposed within a blade server.

6. A method comprising:
    providing an information handling system including a network device and a processor disposed within the information handling system, wherein:
        the processor is operable to change content information from a first type to a second type;
        the information handling system has an address; and
        the network device includes:
            a host port coupled to the processor;
            a first network port coupled to a first network system;
            a second network port coupled to a second network system; and
            a switch operable to direct a communication originating from or passing through the first information handling system;
    directing a first communication from the processor to the first network port when the first communication has a first target address that is less than the address of the information handling system;
    directing a second communication from the processor to the second network port when the second communication has a second target address that is greater than the address of the information handling system;
    directing a third communication from the first network system to the host port when the third communication has a third target address that is the same as the address of the information handling system; and
    directing a fourth communication from the first network system to the second network port when the fourth communication has a fourth target address that is greater than the address of the information handling system.

7. The method of claim 6, further comprising:
    directing a fifth communication from the second network system to the first port when the fifth communication has a fifth target address that is less than the address of the information handling system; and
    directing a sixth communication from the second network system to the host port when the sixth communication has a sixth target address that is the same as the address of the information handling system.

8. The method of claim 7, wherein:
    a seventh communication directed to the host port is of the first type; and
    the method further comprises:
        operating the processor to change the seventh communication from the first type to the second type; and
        communicating the seventh communication to the host port.

9. The method of claim 7, wherein:
    the information handling system is a first blade server;
    the first network system is a second blade server; and
    the second network system is a third blade server.

10. The method of claim 7, wherein the information handling system, the first network system and the second network system are coupled to a local area network.

* * * * *